United States Patent [19]
Matsui

[11] Patent Number: 5,264,015
[45] Date of Patent: Nov. 23, 1993

[54] SCREEN HAVING AN AIR CLEANING FUNCTION

[75] Inventor: Shigeo Matsui, Tokyo, Japan

[73] Assignee: Japan Air Curtain Company, Ltd., Tokyo, Japan

[21] Appl. No.: 941,984

[22] Filed: Sep. 8, 1992

[30] Foreign Application Priority Data

Aug. 7, 1992 [JP] Japan .................... 4-211760

[51] Int. Cl.$^5$ ............................. B01D 46/00
[52] U.S. Cl. ......................... 55/467; 55/473; 55/DIG. 29
[58] Field of Search ................. 55/188-192, 55/467, 473, DIG. 29

[56] References Cited

U.S. PATENT DOCUMENTS

| 4,339,250 | 7/1982 | Thut | 55/467 |
| 4,749,390 | 6/1988 | Burnett et al. | 55/467 |
| 4,929,262 | 5/1990 | Balon, Jr. et al. | 55/467 |
| 4,968,333 | 11/1990 | Ellis et al. | 55/473 |

FOREIGN PATENT DOCUMENTS 2362343 3/1978 France ................ 55/467

Primary Examiner—Charles Hart
Attorney, Agent, or Firm—Bauer & Schaffer

[57] ABSTRACT

A space surrounded by screens to provide a stable negative pressure preventing contaminated air from flowing out of the space and cleaning the contaminated air before discharged from the space. Air ports and fans are provided in the screen.

3 Claims, 9 Drawing Sheets

SCREEN HAVING AN AIR CLEANING FUNCTION

BACKGROUND OF THE INVENTION

1. Field of the Invention

The present invention related to a screen used for partitioning a room, and more particularly to a screen of this kind equipped with an air cleaner or a fan so as to have an air cleaning function.

2. Description of the Prior Art

Screens are widely utilized because of the following advantages. First, a screen can be installed for partitioning a room more easily than a wall because architectural tools are not necessary. The screen can be easily moved and removed in accordance with a change in usage of the room. An appropriate height of the screen which does not extend up to the ceiling provides good visibility and does not give an restrictive feeling so that people feel free from isolation. Since the conventional screen is used only for the purpose of partitioning a room, it does not produce any other effect than defining a space from the floor to a certain height. However when conventional screens are used to partition a room into a plurality of sections, contaminated air (e.g., cigarette smoke, bad air, toxic gases or the like) or odors may flow into a section from the outside or from another section through the space between the top of the screens and the ceiling since air is allowed to flow freely between the sections through this space.

To solve the above problems, the prior art has proposed: (1) A screen with air curtain (Japanese Laid-open Utility Model Application No. 1-114874, hereinafter "JP 874"); and (2) A screen with an air cleaner and an air curtain (Japanese Laid-open Patent Application No. 2-45014, hereinafter "JP 014").

JP '874 discloses a screen body having an air blowing outlet on a upper portion and an air inlet on a lower portion; and a fan arranged inside this screen body. In this prior art example, one or more screen bodies are installed to surround part of a room with their air inlets directed inwardly, air is drawn from the air inlets of the screen bodies through the fan and discharged from the air blowing outlets to form an air curtain above the screen bodies, whereby a space or part of the room is defined by this air curtain and the screen bodies, with the result that air possibly contaminated in this space is prevented from flowing to the outside.

JP '014 discloses an air blowing outlet on a screen body for forming an upwardly directing air curtain; an air inlet and an air discharging port on one surface and the opposite surface of the screen body, respectively; an air cleaner and a fan between the air discharging port and the air inlet; and an airflow amount adjuster arranged on the downstream side of the fan in the screen body for adjusting an amount of air discharged from the air discharging port. One or more screens are installed to surround part of a room, with the air inlets directed inwardly, to thereby define a space or the part of the room by this air curtain and the screen bodies. Further, when air is discharged from the air discharging port, the discharged air amount is adjusted by the airflow amount adjuster so as to be larger than an amount of air which is involved in the space from the outside, whereby a negative pressure state is established in the space to prevent contaminated air in this space from flowing to the outside to maintain the cleanliness of the whole room except for this space.

However, in JP '874 since the airflow amount is increased as the air curtain blowing up from above the screen bodies involves air from both inside and outside the space defined by the screens and the air curtain, cigarette smoke and other pollutants, if produced in this space will be mixed in the air curtain. To prevent such contaminated air from flowing to the outside of the space, additional facilities such as an air intake pipe and an air discharger are required for discharging, from the ceiling for the floor located in the space, an amount of air larger than an amount of air involved from the outside of the space by the air curtain. Furthermore, by installing these facilities, it becomes necessary to maintain a negative pressure state inside the space.

JP '014 is advantageous in removing the necessity of additionally installing an air intake pipe and an air discharger on the ceiling, holding a space in a room surrounded by the screen bodies and the air curtain in a negative pressure state, and maintaining the cleanliness of the space. However, since this prior art reference produces a pressure loss caused my airflow amount adjuster such as a damper which adjusts the amount of air discharged from the air discharging port, a larger fan and a high-power motor are required in order to maintain a predetermined amount of discharged air and an air amount required to form an air curtain.

SUMMARY OF THE INVENTION

The present invention solves the above-mentioned problems. Its object is to provide a screen having an air cleaning function which is capable of constantly developing a negative pressure in a space defined in a room to prevent contaminated air produced in the space from flowing outward, and cleaning contaminated air without installing an air intake pipe or an air discharger on the ceiling of the room or the like.

To achieve the above objective, a filter assembly and an air curtain assembly are housed in a body. Each assembly includes an air blower, an inlet port and an outlet port. In both assemblies the inlet ports are on the same wall of this body, while in the filter assembly the outlet port is on the opposite wall and in the air curtain assembly the outlet port is at the top of the body. A plurality of these assemblies are installed in a room so as to surround at least a portion of the room, so that they are directed inwardly, and a space within the room is defined by an air curtain. The amount of air discharged by the air discharging means provided in the filter assembly is set to discharge a larger amount of air than the amount of air discharged by the air curtain assemblies.

The above and other objects, features and advantages of the present invention will become more apparent from the following description of the preferred embodiments when read in conjunction with the accompanying drawings.

DESCRIPTION OF THE PREFERRED EMBODIMENTS

Embodiments of the present invention will hereinafter be described in detail with reference to the accompanying drawings.

Figure 1:
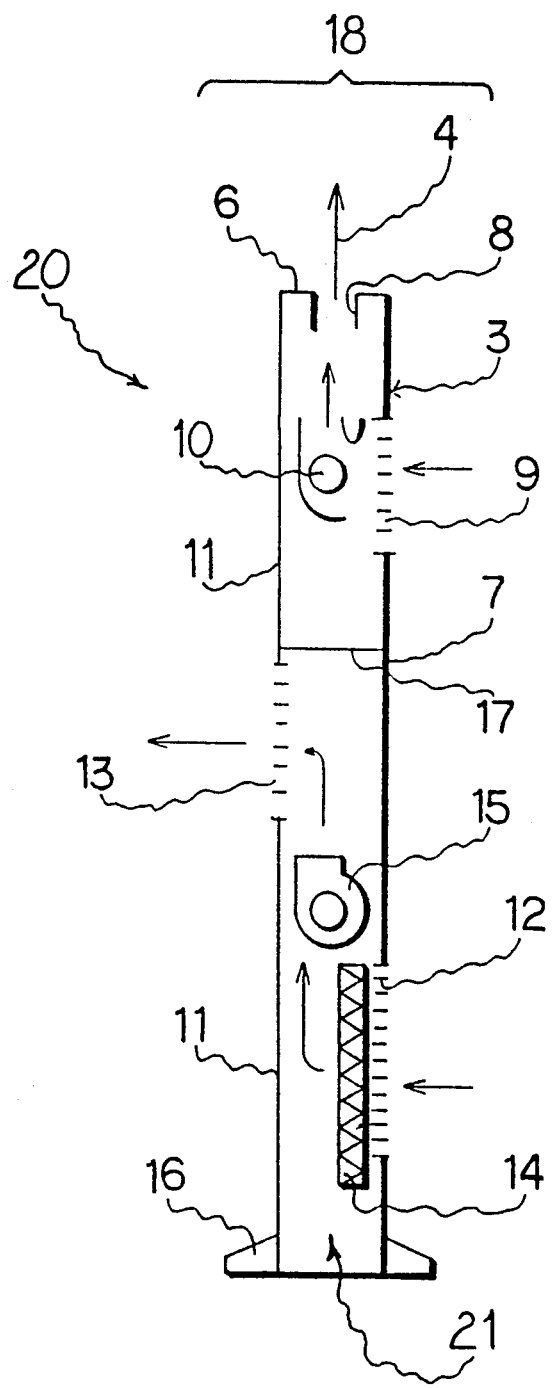
FIG. 1 is a vertical sectional view showing a screen having an air cleaning function according to one embodiment of the present invention.
Figure 2:
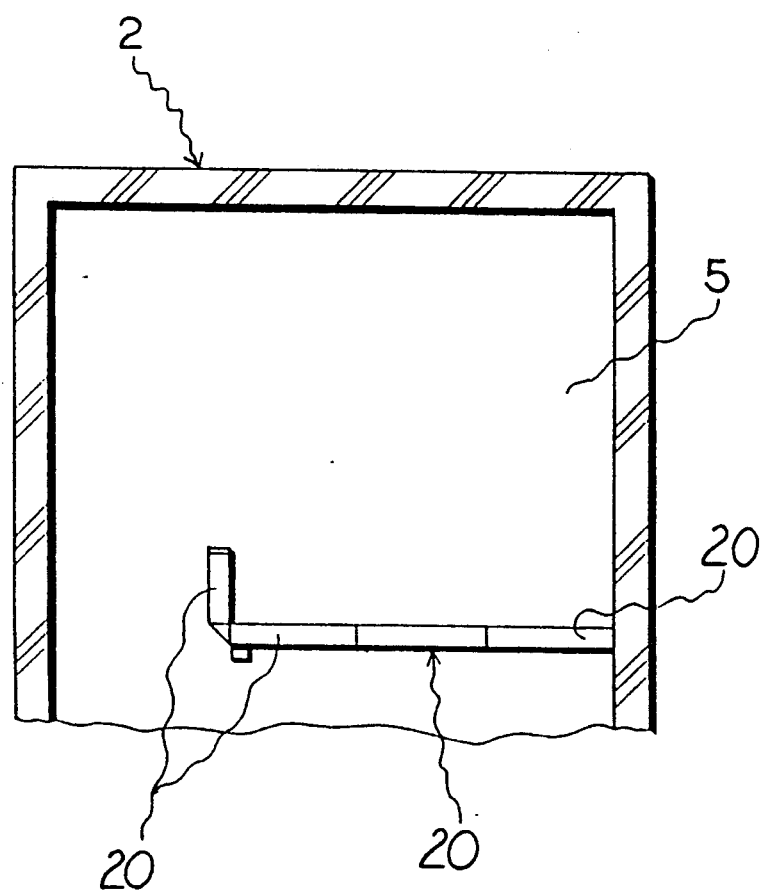
FIG. 2 is a plan view showing the air cleaning screens installed in a room.

FIG. 1 shows an apparatus 20 having a filter assembly 21 and an air circulation assembly 3 in a vertical body 18, having an air cleaning function, wherein one or more of the apparatus' 20 are installed to surround part of a room 2, as shown in FIG. 2, with a circulation air inlet 9 and an air inlet 12 of each apparatus directed inwardly, as will be later described in detail. An amount of air discharged by fan 15 located in the filter assembly 21 is greater than an amount of air which is discharged in air curtain 4 formed by fan 10. Referring to FIG. 1, the air circulation assembly 3, is provided with an opening 8 on a top surface 6 thereof for creating the upwardly directed air curtain 4, together with the circulating air inlet 9 formed on inner wall 7 of the apparatus; the fan 10 disposed between the air opening 8 and the circulating air inlet 9; an air inlet 12 on the inner surface 7 and an outlet 13 on the outer surface 11, and filter 14 and fan 15 disposed between the air inlet 12 and outlet 13.

The apparatus 20 has a plate-like appearance, base 16 in a lower part thereof, and a shape appropriate to surround part of a room, as illustrated in FIG. 1. There are several kinds of screen prepared having different widths and heights so as to match a variety of applications.

One or more of the apparatus 20 are installed in the room 2 as stated above to surround part of the room 2 with opening 8 on top for generating an air curtain. Opening 8 may have an arbitrary shape as long as it can form an upwardly directed air curtain 4. For example, opening 8 may have a long rectangular shape, a plurality of holes arranged in a row, or a plurality of nozzles arranged in a row. Air blown out of opening 8 enters through air inlet 9 formed on inner surface 7, by the action of the fan 10. Fan 15 is separated by a separating plate 17 from opening 8. The air blown out of opening 8 forms the upwardly directed air curtain 4 which in turn defines the space 5 together with the apparatus' 20. Although any fan 10 may be utilized, as long as it can form an air curtain, a percolation type fan is the most appropriate to this embodiment. In a lower portion of the surface 7, there is an opening 12 through which air in the space 5 enters by the action of fan 15. This air is cleaned by filter 14 and discharged outside the space 5 through outlet 13 on outer surface 11. The amount of air discharged from outlet 13 is set to be larger than the amount of air involved by the air curtain 4 from the outside of the space 5 (hereinafter referred to as the externally involved air amount Q), thereby developing a negative pressure state in the space 5. In other words, the air discharging amount of fan 15 is set to be larger than the externally involved airflow amount Q.

Generally, an air amount discharged from the air discharger 15 is calculated by the following equations:

$$Qt = 0.55(H/W_0)^{\frac{1}{2}} \quad \quad 1$$

$$Q > \frac{1}{2}(Qt - Q_0) \quad \quad 2$$

wherein Q = externally involved airflow amount [m³/min]
$Q_0$ = amount of air curtain airflow [m³/min]
$W_0$ = Width of the air curtain outlet [m]
H = Distance from the top of the apparatus to the ceiling [m]
Qt = amount of airflow in air curtain which reaches the ceiling [m³/min]

The type of fan 15 is not particularly limited. Filter 14 is also not particularly limited and may be a filter or an electric dust collector.

The following is a description on how to utilize apparatus 20 as described above.

First, apparatus 20 having appropriate height and width is selected in conformity with the shape and size of a room 2, and a necessary number are prepared. In the example shown in FIG. 2, four apparatus, are installed. In this event, they are installed to surround part of the room 2 in a manner that air inlet 9 and opening 12 are directed toward the space 5 in FIG. 2. Then, fans 10 and 15 are operated. When fan 10 starts operating, air enters from 9 and blows out through opening 8, thereby forming air curtain 4. This air curtain 4 and apparatus, 20 surround part of room 2 to define space 5 in which air is circulated. In this event, the air curtain 4 involves air outside the space 5 (the externally involved air amount Q).

Since fan 15 is also operating, air within space 5 is drawn through opening 12 and cleaned by a filter or the like 14. The clean air thus produced is discharged from outlet 13, formed on outer surface 11, by fan 15. In this event, the airflow amount of fan 15 is set to a larger Value than the externally involved air amount Q, thereby developing a negative pressure within space 5. Therefore, even is a person smokes a cigarette within space 5 in the negative pressure state, the smoke will never leak from space 5 to the outside but instead is drawn through opening 12, cleaned by filter 14, and discharged to the outside.

In summary, apparatus 20 forms space 5 which is maintained in a stable negative pressure state, wherein even if a person smokes inside space 5, the smoke will never leak outside space 5, thereby making it possible to keep the environment inside room 2 satisfactory.

Figure 3:
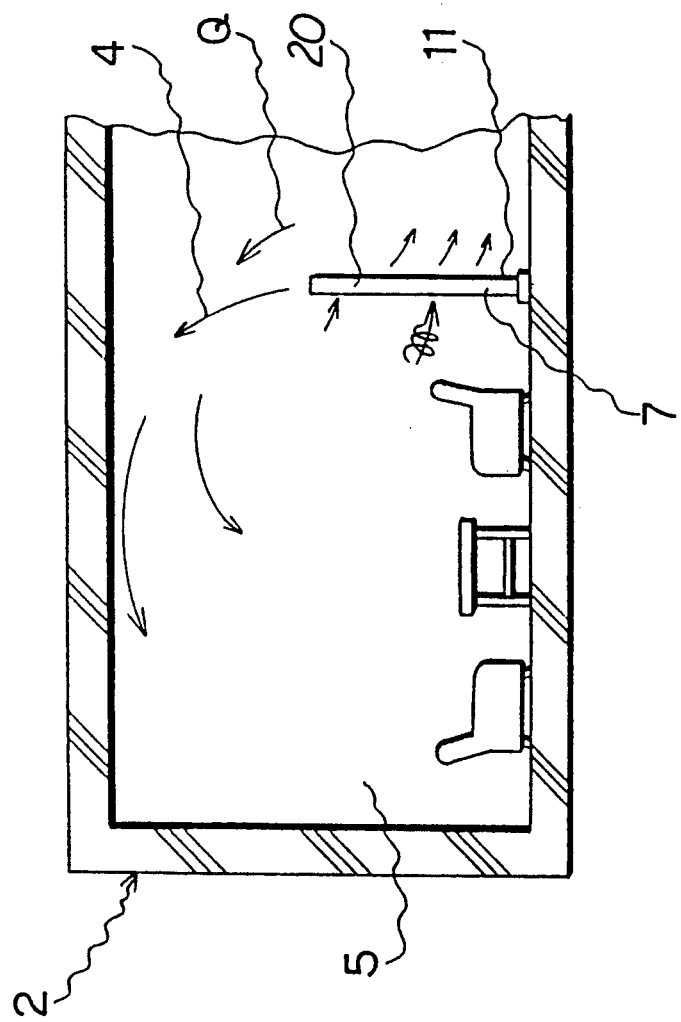
FIG. 3 is a lateral view showing the flow of air when the air cleaning screens are installed in a room.
Figure 4:
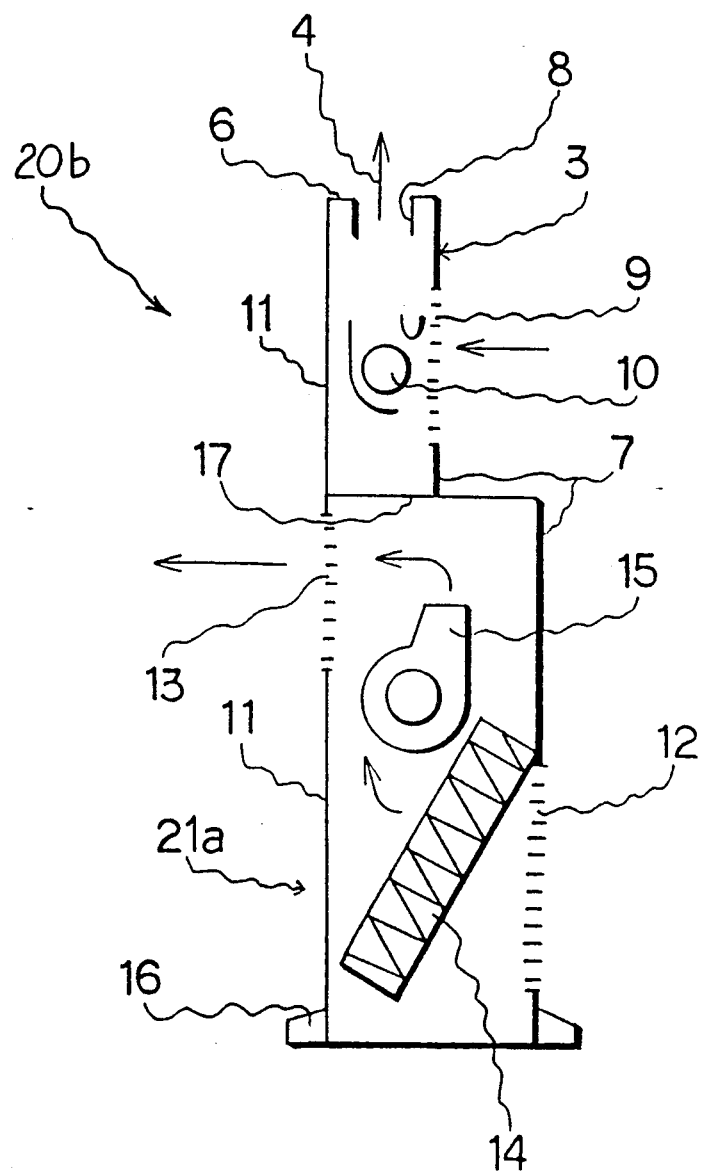
FIG. 4 is a vertical sectional view showing a screen according to another embodiment of the present invention.
Figure 5:
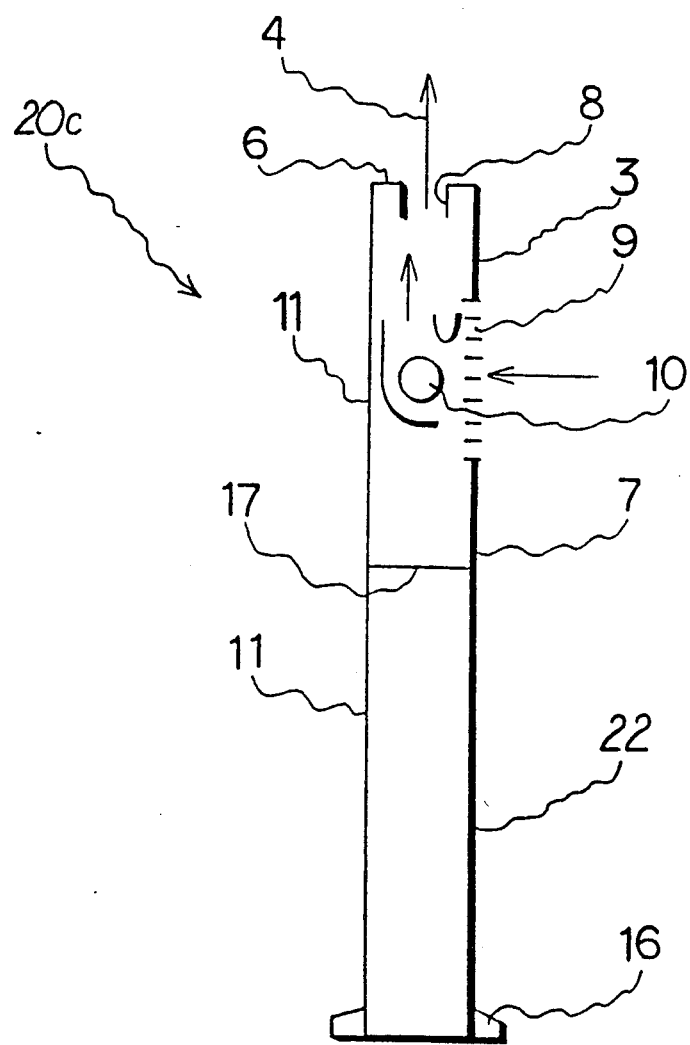
FIG. 5 is a vertical sectional view showing a screen comprised of an air circulating assembly.

FIGS. 4-9 illustrate another embodiment of the present invention. FIG. 4 shows an apparatus 20b having an air cleaning function which comprises a combination of an air filter assembly 21a equipped with fan 15 with a larger airflow capacity than air filter assembly 21 and a filter 14 also with a larger operating amount. FIG. 5 shows apparatus 20c which forms an air curtain but has no filter assembly. The rest of the construction is similar to that of the embodiment shown in FIGS. 1-3, so that the same reference numbers are given to the corresponding parts.

Figure 6:
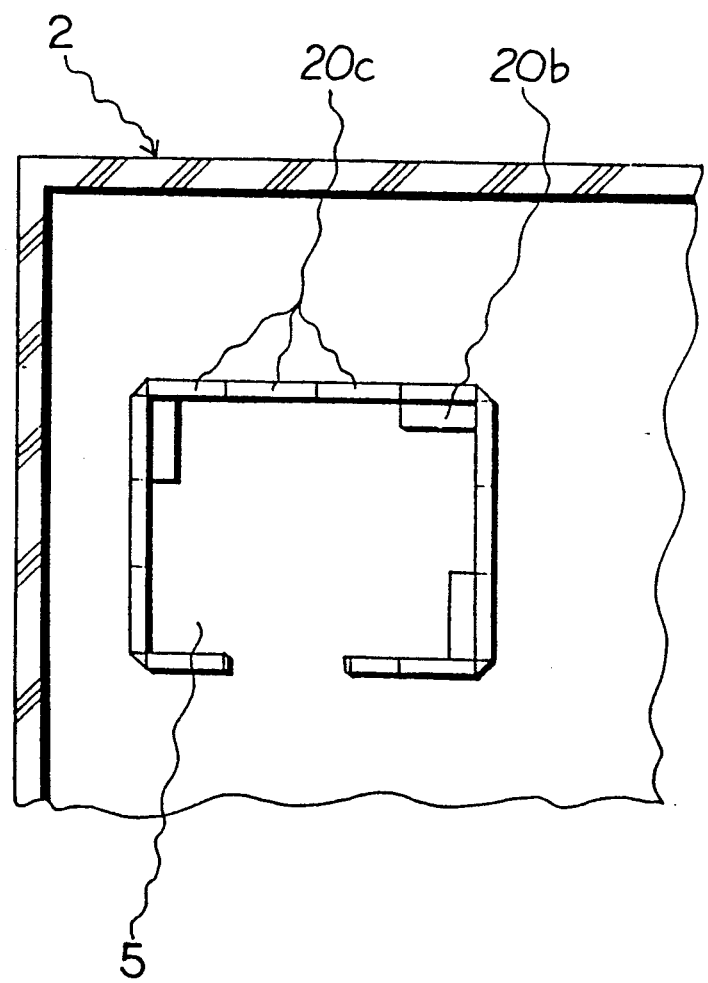
FIG. 6 is a plan view showing a further embodiment of air cleaning screens installed in a room.
Figure 7:
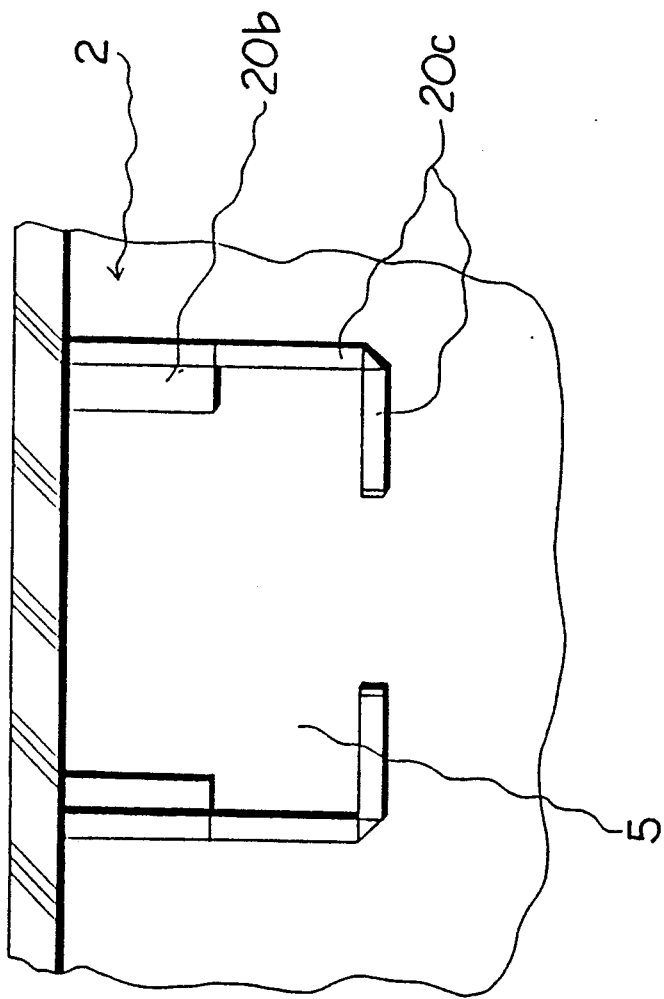
FIG. 7 is a plan view showing a further embodiment of air cleaning screens installed in a room.
Figure 8:
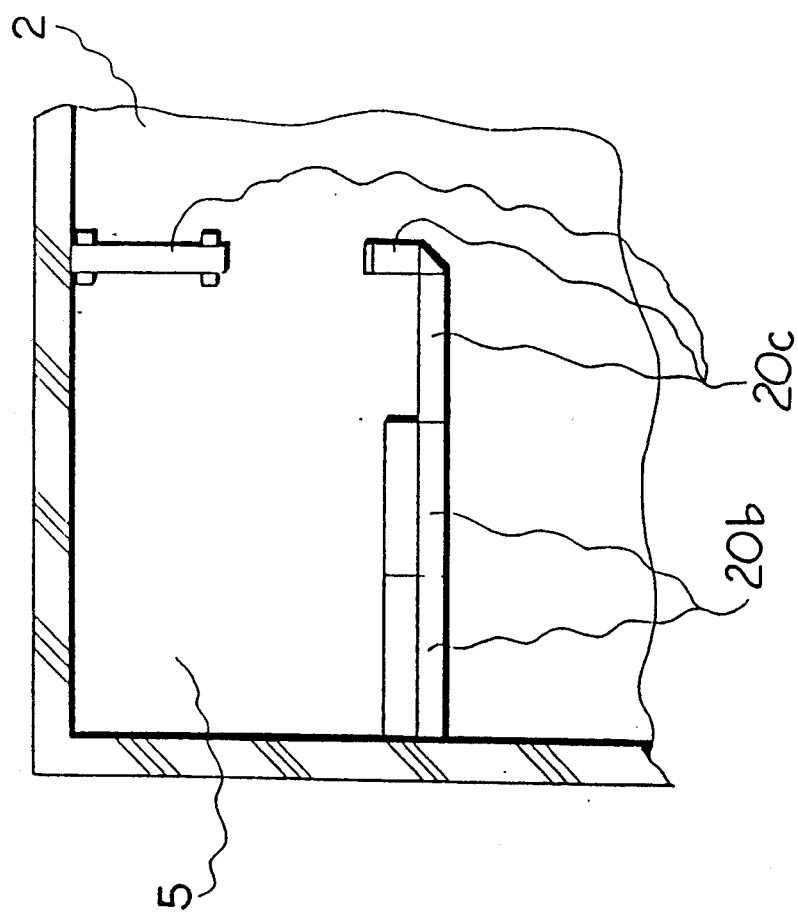
FIG. 8 is a plan view showing a further embodiment of air cleaning screens installed in a room.
Figure 9:
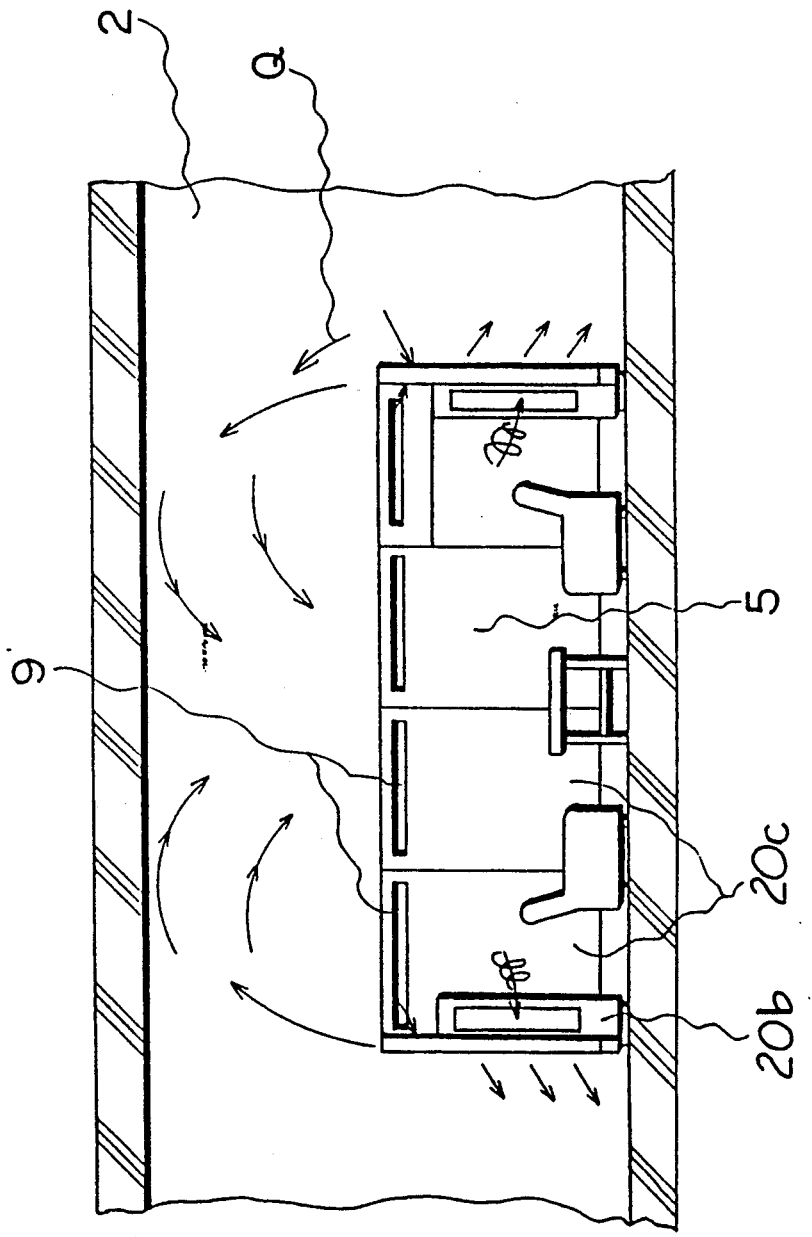
FIG. 9 is a lateral view showing a further embodiment of the flow of air when the air cleaning screens are installed in a room.

Referring to FIGS. 6-8, apparatus' 20b and 20c for an air curtain of appropriate height and width are first selected and several sets of these selected apparatus, are prepared. They are installed as shown in FIGS. 6-8. The apparatus, 20b and 20c are installed such that air inlet 9 and air inlet 12 are located on the side of a space 5, while outlet 13 are directed outside the space 5. Next, fans 10 and 15 are operated. When fan 10 operates, air enters air inlet 9 and exits from opening 8 to form an air curtain 4. This air curtain 4, and apparatus' 20b and 20c surround part of a room 2 to define the space 5, in which air is circulated. In this event, the air curtain 4 involves air (externally involved air amount Q) from the outside of the space 5. Similarly to the foregoing embodiment shown in FIGS. 1-3, air within the space 5 is cleaned by filter 14 which has a larger capacity than filter assembly 21 and discharged from outlet 13 by fan 15 which has a larger airflow amount to develop a negative pressure in the space 5. By the combination of apparatus 20b, equipped with the air cleaner and apparatus 20c for generating an air curtain according to this embodiment, the enclosing screens can be made more compact, the number of filters 14 is reduced, and maintenance is correspondingly facilitated.

As described above in detail, according to the present invention, the fans arranged in the apparatus are operated to draw air from the air inlets and blow the air from the opening in the top to form an upwardly directed air curtain, whereby part of a room is surrounded by the air curtain and the plurality of apparatus'. Then, the fans are operated to draw air within the space from the air inlets to clean the air with the filters. Since the amount of clean air discharged from the air outlet by the fan is set to be larger than the amount of air involved from the outside of the space, a negative pressure is developed within the space, whereby contaminated air possibly generated within the space will never leak to the outside. It is not necessary to provide separate intake pipes and fans on the ceiling or the like, so that the air cleaning apparatus can be easily installed at any part of a room for preventing contaminated air such as cigarette smoke with the surrounded space from leaking to the outside. In addition, since the fan for forming an air curtain and the fan for cleaning air and discharging the cleaned air to the outside of the space are separately provided, the air curtain can be stably formed without pressure drop, compared with a case when an air amount is adjusted by an airflow amount adjusting means such as a damper, thereby presenting a good operating efficiency as a whole.

Also, in the second embodiment where the apparatus equipped with an air cleaner and the apparatus exclusively for generating an air curtain are separated, the size is more compact, which allows the user to easily lay out the screen a room and particularly facilitates maintenance of the air cleaner.

I claim:

1. Apparatus comprising a filter assembly and an air curtain assembly housed in a vertical body and separated from each other, the body having an inner wall and an outer wall;
   said filter assembly comprising an air inlet in the inner wall and an outlet opening in the outer wall, a filter located in said air inlet; and a fan located within said body between said inlet and outlet openings;
   said air curtain assembly further comprising an air inlet in the inner wall, an air outlet in the upper end of said vertical body and a fan for directing the air entering through the air inlet upward through the opening on the top surface to form an air curtain above said body.

2. Apparatus comprising a filter assembly and an air curtain assembly housed in a vertical body and separated from each other, the body having an inner wall and an outer wall;
   said filter assembly comprising an air inlet in the inner wall and an outlet opening in the outer wall, a filter located in said air inlet; and a fan located within said body between said inlet and outlet openings;
   said air curtain assembly further comprising an air inlet in the inner wall, an air outlet in the upper end of said vertical body and a fan for directing the air entering through the air inlet upward through the opening on the top surface to form an air curtain above said body;
   wherein said air outlet in said air filter assembly discharges greater amounts of air than the amount discharged from said air curtain assembly.

3. Apparatus comprising a filter assembly and an air curtain assembly housed in a vertical body and separated from each other, the body having an inner wall and an outer wall;
   said filter assembly comprising an air inlet in the inner wall and an outlet opening in the outer wall, a filter located in said air inlet; and a fan located within said body between said inlet and outlet openings;
   said air curtain assembly further comprising an air inlet in the inner wall, an air outlet in the upper end of said vertical body and a fan for directing the air entering through the air inlet upward through the opening on the top surface to form an air curtain above said body;
   wherein said filter assembly and said air curtain assembly are separated by a plate.

* * * * *